Dec. 12, 1933.　　　R. G. McDOWELL　　　1,939,563
LUBRICATOR
Filed Aug. 31, 1931
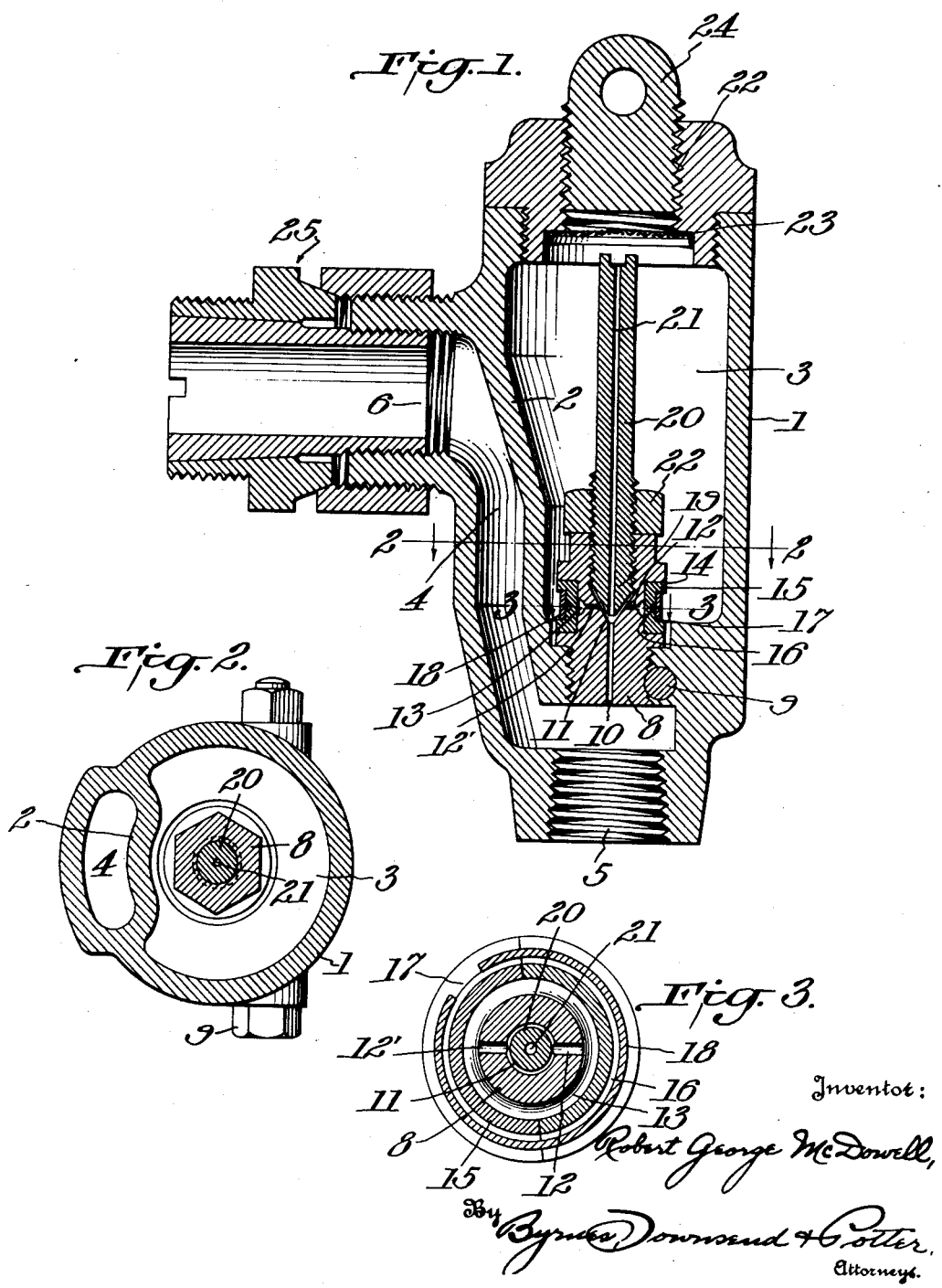

Patented Dec. 12, 1933

1,939,563

UNITED STATES PATENT OFFICE 1,939,563

LUBRICATOR

Robert George McDowell, Butte, Mont.

Application August 31, 1931. Serial No. 560,447

8 Claims. (Cl. 184—55)

This invention relates to lubricators and especially to lubricators for pneumatic apparatus. More particularly, the invention relates to lubricators of the type wherein the lubricator is connected in the air supply line ahead of the apparatus to be lubricated, wherein a lubricant is positively injected into the supply line to be carried by the air to the apparatus to be lubricated.

An object of the present invention is to provide a lubricator of the above type which will be simple and rugged in construction and effective in operation.

Another object of the invention is to provide a lubricator which is particularly adapted for use with rock drilling apparatus and which will operate effectively under all conditions met in such operation, such as variant air pressure, variant humidity, variant oil viscosity and the like.

Other objects will appear from the following description taken with the appended drawing wherein:

Fig. 1 is a longitudinal sectional view,

Figs. 2 and 3 are views of sections taken along lines 2—2 and 3—3 respectively of Fig. 1.

An approximately cylindrical casing 1 has a partition 2 dividing the interior into a generally cylindrical reservoir and a flat air conduit 4 which extends along the side of the reservoir 3 from an inlet 5 alined with the reservoir 3 to an outlet 6 at one side of the casing 1.

Provided in the partition 2, in alinement with the inlet 5, is a perforation which receives a threaded plug 8 that may be locked in position by a lock bolt 9, the plug 8 having a small axial passage 10 extending from its lower end to a conical opening 11 into which two radial passages 12 and 12' lead. The outer ends of the radial passages 12 and 12' open into a circumferential groove 13 which lies at the bottom of a large, circumferential channel 14 in which is fitted the two cooperating halves of a split valve ring 15. The ring 15 is provided in its outer side with a circumferential groove 16 lying at the bottom of a larger channel 17 in which is disposed a singly split spring ring 18 adapted to retain the two halves of the valve ring 15 in the groove 14.

Threaded into the upper end of the plug 8, and having a tapered end 19 entering the conical hole 11 is a needle valve 20, through which axially extends a small passage 21 alined with the passage 10 in the plug 8. The valve 20 is secured by a lock nut 22 threaded thereon, above the upper end of the plug 8. Adjustment of this valve 20 is accomplished through an opening 22 in the upper wall of the casing 1 which opening 22 is provided with a strainer 23 and also serves as a means for introducing lubricant into the reservoir. The opening is closed by a threaded stopper 24.

The inlet 5 and outlet 6 are threaded for the attachment of the two ends of the air supply line (not shown), a coupling 25 of known type being shown attached to the outlet. If desired, the outlet 6 may be connected directly to the pneumatic machine (not shown).

The operation of the lubricator is as follows:

Owing to the inherent operating characteristics of the compressed air apparatus attached to the air supply line in which the lubricator is connected, the flow of air is pulsating in its nature. The variations in air pressure within the conduit are reflected in pressure variations in the passages within the lubricator, and such pressure variations effect a cyclic opening and closing of the valve ring 15, which cyclic operation of valve ring 15 results in a slow flow of lubricant from the reservoir to the conduit. Mechanical vibration also has an influence on the flow of lubricant, as the feed is a maximum when the lubricator is mounted directly on a drill and decreases with an increase in the length of the conduit between the drill and the lubricator.

The amount of lubricant passing from the reservoir 3 may be controlled by adjusting the needle valve 20 in the plug 8. When the needle valve 20 is screwed further into the plug 8, the tapered end 19 of the valve 20 enters further into the conical opening 11 to decrease the size of the path of communication between the radial passages 12, 12' and the axial passages 10. Increase in the flow of oil is accomplished by screwing the valve 20 further out of the plug 8.

The particular lubricator shown in the drawing is designed to replace the elbow connection by which the vertically disposed end of an air conduit is secured to the air inlet of a rock drill. It will be apparent that the invention is not restricted to this particular arrangement and that the inlet and outlet of the lubricator may be so located that the lubricator may be associated with a vertical or a horizontal air conduit.

I claim:

1. A lubricator for pneumatic apparatus comprising, a main air conduit, a lubricant reservoir, a passage connecting said conduit and the portion of said reservoir below the lubricant level, a check valve in said passage, a second passage connecting said conduit and the portion of said reservoir above the lubricant level, and a second valve located in said first passage for adjusting the effective size thereof, said valve having a passage therethrough forming a part of said second passage.

2. A lubricator for pneumatic apparatus comprising, a main air conduit, a lubricant reservoir, a member having a passage therethrough connecting said conduit and said reservoir, valve means for said passage including a split ring surrounding said member and normally closing said passage.

3. A lubricator comprising a main air conduit, a lubricant reservoir, a member disposed between said conduit and said reservoir, said member being provided with a longitudinal passage communicating with said conduit, said member having a peripheral channel communicating with said reservoir and a second passage connecting said groove and said first passage, and a split ring in said channel normally preventing fluid flow through said second passage.

4. A lubricator as set forth in claim 3, wherein said second passage opens into a peripheral groove located at the base of said channel, and said split ring interrupts communication between said channel and said groove when the ring is seated upon the base of said channel.

5. A lubricator for pneumatic apparatus comprising, a chambered member having a partition to define an air conduit extending therethrough and a lubricant reservoir, and an opening in said partition and extending between said conduit and said reservoir, a plug member closing said opening and extending into said reservoir, said member having a pair of passages extending therethrough, one passage being an axial passage affording uninterrupted communication between said conduit and said reservoir, the second passage extending transversely of said member below the lubricant level in said reservoir and opening into said axial passage, and a check valve normally preventing the flow of lubricant through said second passage.

6. The invention as set forth in claim 5, wherein said check valve comprises a split ring encircling said plug member and spring means normally contracting said split ring to close said second passage.

7. The invention as set forth in claim 5, wherein is provided a needle valve movable in said plug member and cooperating with a portion of said axial passage to thereby provide adjustment of the effective size of said axial passage.

8. The invention as set forth in claim 5, wherein is provided a needle valve movable in said plug member and cooperating with a portion of said axial passage to thereby provide adjustment of the effective size thereof, said needle valve having a passage therethrough which communicates with the reservoir above the lubricant level therein and with said axial passage.

ROBERT GEORGE McDOWELL.